Patented Oct. 2, 1945

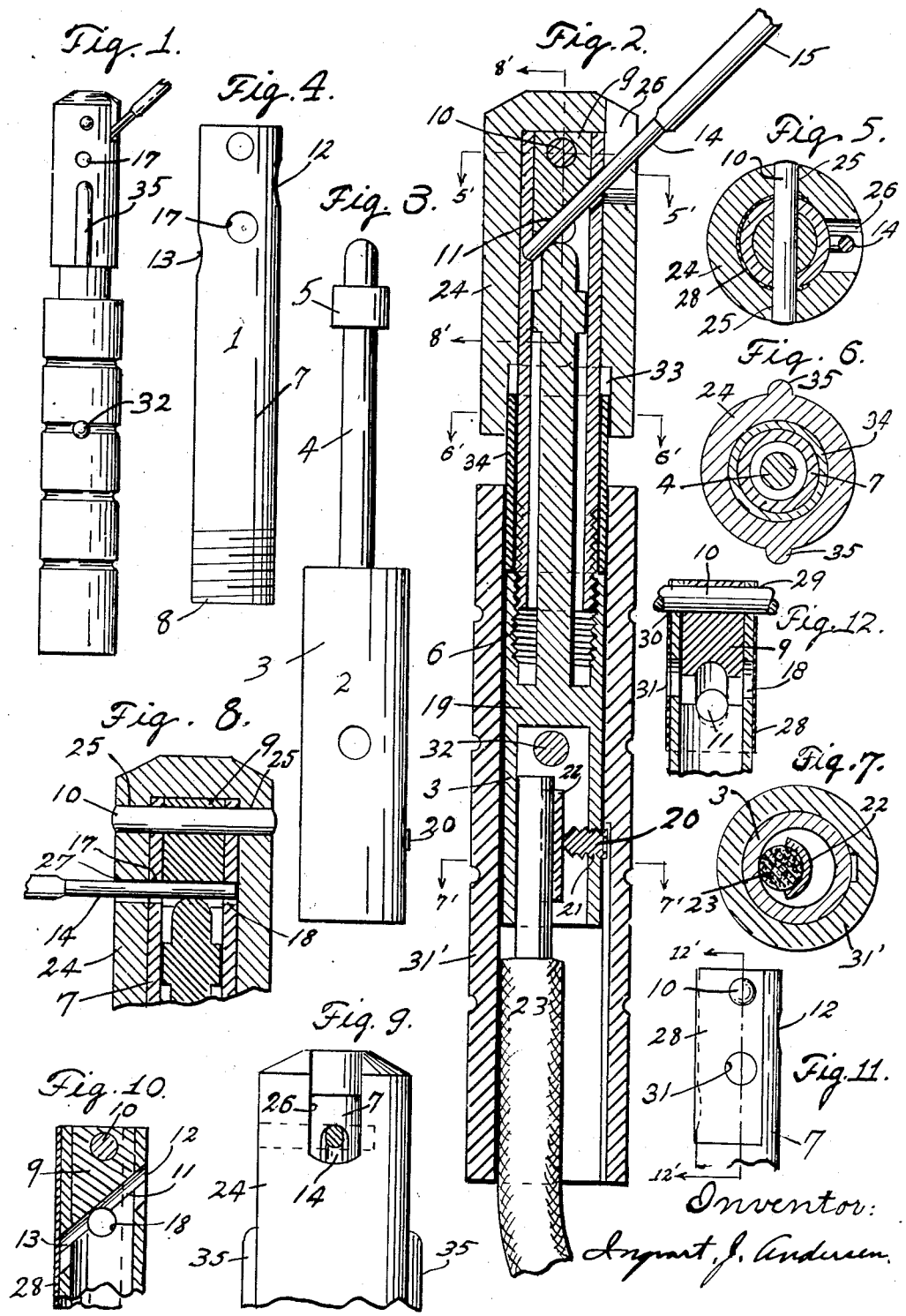

2,386,080

UNITED STATES PATENT OFFICE 2,386,080

ELECTRODE HOLDER

Ingvart J. Andersen, Oakland, Calif.

Application April 26, 1943, Serial No. 484,521

4 Claims. (Cl. 219—8)

My invention relates to improvements in an electrode holder for arc welding, which embodies at once a handle and a holder for removably securing the welding rod.

An object of the invention is the provision of a handy, safe and thoroughly reliable holder.

Other and more specific objects and purposes of the invention will become apparent as the specification continues.

It is to be noted that while but a single embodiment of the present invention is shown in the accompanying drawing, changes in the precise embodiment thereof may be made within the scope of what is claimed without departing from the spirit thereof.

In the accompanying drawing—

Figure 1 is a side elevational view of the holder showing a portion of a welding rod removably secured in one position thereon;

Figure 2 is an enlarged vertical axial sectional view showing coacting parts comprising the chassis or framework of the invention disposed in relative positions for clamping the welding rod therebetween;

Figure 3 is a side elevational view of the lower unit of the framework;

Figure 4 is a side elevational view of the upper unit of the framework;

Figure 5 is a cross sectional view on line 5'—5' of Fig. 2;

Figure 6 is a cross section on line 6'—6', Fig. 2;

Figure 7 is a cross section on line 7'—7', Fig. 2;

Figure 8 is a sectional view on line 8'—8', Fig. 2, showing a fragmental portion of the welding rod disposed in horizontal position;

Figure 9 is a front elevational view of the upper end portion of the holder and a cross sectional view of the welding rod disposed in oblique position thereon;

Figure 10 is a vertical sectional view of the upper end portion of the upper unit and the stop plate;

Figure 11 is a side elevational view of the upper end portion of the upper unit, showing the stop plate disposed thereagainst; and Figure 12 is a vertical section on line 12'—12' of Fig. 11.

Referring now to the drawing in stricter detail, throughout which like reference characters designate like parts:

The numerals 1 and 2 designate the upper and lower units, respectively, comprising the frame or chassis of the present holder.

The lower unit 2 embodies a tubular part 3 and an upstanding stem part 4 having a lower diametrically enlarged portion 5 rigidly secured to a mid portion of the inner wall of the part 3.

The upper end of the part 3 is internally threaded as at 6.

The upper unit 1 comprises a tubular member 7 disposed to circumferentially encircle the stem 4 with its lower externally threaded end 8 projecting into and threadedly engaging the internal threads of the part 3.

A cylindrical bearing plug 9 is fitted into the upper end of the tube 7 and fixedly secured therein by means of a pin 10 projecting transversely through both said plug and tube.

The lower surface of the plug 9 extends obliquely with respect to the axis of the tube 7 and has a centrally disposed groove 11 extending along said surface.

Openings 12, 13 in opposite wall portions of the tube 7 align with the groove 11 and, in cooperation therewith, form a bearing in which to secure the reduced end portion 14 of the welding rod 15 disposed to project through said openings.

The portion 14 of the welding rod is firmly but removably held in the groove 11 by stem 4 moved upwards to press thereagainst by the proper relative rotation of the units 1 and 2. Obviously, to release the welding rod, the said units would be rotated, relatively, in the opposite directions.

The welding rod 15 may, if desired to facilitate its application to certain work to be performed, be disposed at right angles to the holder as shown in Fig. 8, instead of obliquely as indicated in Figs. 1 and 2. In which instance the portion 14 is projected through opposed openings 17, 18 in the walls of the tube 7 and the stem 4 moved upwards to contact and press said portion 14 firmly against the upper margins of said openings, by relative rotative movement of the units 1 and 2 as above described for securing the welding rod in its oblique position.

The stem 4 is of lesser diameter than the interior diameter of the tube 7, whereby an air space is provided between said stem and tube. However, to maintain the stem centrally in the tube, the upper end portion thereof is provided with a diametrically enlarged portion 19, which fits closely but readily rotatively and vertically movable in said tube. This enlarged portion of the stem also functions as means for preventing scale and sputterings of hot metal and the like from traveling downwards between the stem and the inner wall of the tube to the lower unit and thereby interfering with the proper functional movements of the units.

A set screw 20 threaded through a threaded opening 21 in one side wall of the lower unit 2, coacting with a clamping plate 22, functions for clamping one end of a current supply cable 23 firmly against the inner wall of said unit.

A hood element 24, formed of suitable insulating material, embraces the upper portion of the tube 7 and is fixedly secured thereto by means of the pin 10, both ends of which project through openings 25, 25 formed therein.

A slot 26 in the upper end portion of the hood 24 permits free passage of the portion 14 of the welding rod to the openings 12, 13 and groove 11 when the rod is disposed in oblique position.

An opening 27 in the hood 24 permits free entrance of the portion 14 into the openings 17, 18 when the welding rod is disposed in horizontal position.

A stop plate 28, indicated in Figs. 5, 10, 11 and 12, disposed between the upper end portion of the tube 7 and hood 24, functions as a stop against which the free end of the portion 14 may abut when it is inserted into either its oblique or horizontal position.

Openings 29, 30, in the stop plate 28, through which the pin 10 extends, holds the plate in fixed position between the tube 7 and hood 24.

An opening 31 on one side of the plate 28 (Fig. 11, 12) permits free passage of the portion 14 therethrough when disposed in horizontal position.

A tubular housing 31', formed of insulating material, encircles the lower unit 2 and is firmly secured thereto by means of a pin 32, which projects both through the walls of the said unit and the housing 31.

The lower end of the hood 24 terminates downwardly short of the lower end of the tube 7 and has at its lower end an annular recess 33 into which movably projects the upper end of an insulating sleeve 34, the lower end of which normally seats on the upper end of the unit 2, which terminates upwardly short of the housing 31.

The sleeve 34, which preferably has certain vertical as well as rotative movement relative to the parts 24 and 31, is primarily adapted as insulating means for protecting the operator from contacting the tube 7, which is in electric contact with the welding current.

Longitudinally extending ribs 35, 35, formed on the periphery of the hood 24, provide means to be gripped by the operator when operatively rotating the upper and lower units relatively.

The parts comprising the units 1 and 2 form the electrical connection between the cable 23 and the welding rod 15.

The pin 10, which is in electrical contact with the unit 1, is preferably formed of nonconducting material, or, if preferred, the same may be made of metal and its ends made to terminate short of the outer surface of the hood member 24.

I claim:

1. In an electrode holder of the character described, a tubular base element open at its upper and lower ends, a centrally disposed stem member rigidly secured at its lower end within the tubular base element with its upper portion projecting upwardly and extending beyond the upper end of the tubular base, said stem member being spaced inwardly from the wall of the tubular base element throughout the length of the upper open end of said element, a tubular cap element housing the upper portion of the stem member and adjustably secured to the base element, a bearing plug arranged within the upper end of the cap element and adapted to cooperate with the upper end of the stem member to clamp a welding rod therebetween when the tubular cap element is adjusted relative to the base element, and means for securing an electric supply cable to the lower open end of the tubular base element.

2. In an electrode holder of the character described, a tubular base element open at its upper and lower ends and having a solid mid-section therein, an upwardly extending stem member secured at its base to the mid-section and projecting beyond the upper end of the tubular element, said stem member being inwardly spaced and free from contact with the wall of the tubular base element, a tubular cap element housing the upper portion of the stem member and having a threaded engagement with the base element, a bearing plug carried by the cap element and arranged to cooperate with the upper end of the stem member to clamp an electrode therebetween when the tubular cap element is rotated relative to the base element, and means for removably securing one end of an electric supply cable within the lower open end of the tubular base element.

3. In an electrode holder of the character described, a tubular base element open at its upper and lower ends and having a solid mid-section therein, an upwardly extending centrally spaced stem member secured at its base to the mid-section and projecting freely beyond the upper end of the tubular member, a tubular cap element housing the upper portion of the stem and being adjustably connected to the tubular element, said stem being relatively spaced from the inner side walls of the upper end of the tubular member and the tubular cap to provide an air circulating space along the length of the stem, said cap element and said stem having cooperating parts to clamp an electrode therebetween when the cap is adjusted relative to the stem, and means for securing an electric supply cable to the lower open end of the tubular base element.

4. In an electrode holder of the character described, a metallic tubular base element having an axially extending stem projecting upwardly therefrom, a metallic tubular cap element housing the upper portion of the stem and being adjustably connected to the base element, a bearing plug arranged within the cap element and adapted to cooperate with the upper end of the stem member to clamp a welding rod therebetween when the cap element is adjusted relative to the base element, an insulating hood arranged over the upper portion of the cap element, an insulating tubular handle arranged over the base member and a sleeve of insulating material surrounding the lower portion of the cap element intermediate the insulating hood and the insulating tubular handle.

INGVART J. ANDERSEN.